(12) United States Patent
Brouillette et al.

(10) Patent No.: US 10,455,440 B2
(45) Date of Patent: Oct. 22, 2019

(54) VISUAL PRIVACY SYSTEMS FOR ENTERPRISE MOBILITY MANAGEMENT

(71) Applicant: AirWatch, LLC, Atlanta, GA (US)

(72) Inventors: Nicholas Brouillette, Smyrna, GA (US); Kabir Barday, Atlanta, GA (US)

(73) Assignee: AirWatch, LLC, Atlanta, GA (US)

( * ) Notice: Subject to any disclaimer, the term of this patent is extended or adjusted under 35 U.S.C. 154(b) by 0 days.

(21) Appl. No.: 15/974,731

(22) Filed: May 9, 2018

(65) Prior Publication Data
US 2018/0262932 A1 Sep. 13, 2018

Related U.S. Application Data

(63) Continuation of application No. 15/041,018, filed on Feb. 10, 2016, now Pat. No. 9,980,165.

(51) Int. Cl.
*H04W 24/08* (2009.01)
*H04W 24/10* (2009.01)
*H04W 12/02* (2009.01)
*H04W 12/00* (2009.01)
*H04W 12/08* (2009.01)

(52) U.S. Cl.
CPC ....... *H04W 24/08* (2013.01); *H04W 12/0027* (2019.01); *H04W 12/02* (2013.01); *H04W 12/0802* (2019.01); *H04W 24/10* (2013.01); *H04W 12/00503* (2019.01)

(58) Field of Classification Search
CPC ....... H04L 63/10; H04L 63/105; H04L 63/20; H04L 67/125; H04L 67/34; H04W 12/08; G06F 21/44; G06F 21/45; G06F 3/0637
See application file for complete search history.

(56) References Cited

U.S. PATENT DOCUMENTS

| | | | |
|---|---|---|---|
| 6,931,419 B1 | 8/2005 | Lindquist | |
| 8,737,965 B2 | 5/2014 | McCown | |
| 2006/0095956 A1 | 5/2006 | Ashley | |
| 2010/0169394 A1 | 7/2010 | Hahn | |
| 2011/0047594 A1* | 2/2011 | Mahaffey | G06F 21/564 726/1 |
| 2012/0290545 A1 | 11/2012 | Tumanov | |
| 2013/0305379 A1* | 11/2013 | Udani | G06F 21/51 726/26 |
| 2014/0195927 A1 | 7/2014 | DeWeese | |
| 2014/0245462 A1 | 8/2014 | Mattox | |
| 2015/0095970 A1 | 4/2015 | Shetty | |
| 2015/0169864 A1 | 10/2015 | Lin | |
| 2015/0332066 A1 | 11/2015 | Prakash | |

* cited by examiner

*Primary Examiner* — Liton Miah
(74) *Attorney, Agent, or Firm* — Clayton, McKay & Bailey, PC

(57) ABSTRACT

Systems herein allow a user to use their personal user device to perform functions in an enterprise environment in exchange for enrolling at a management server. The management server can provide a privacy component that allows the user to view a privacy profile summarizing data collection activities of the management server. The management server can dynamically build the privacy profile based on device profile and privacy settings stored on the management server. The privacy profile can be dynamically updated based on changes to privacy settings, and can also provide links for a user to see actual data that has been collected at the management server.

20 Claims, 7 Drawing Sheets

VISUAL PRIVACY SYSTEMS FOR ENTERPRISE MOBILITY MANAGEMENT

This application is a continuation of U.S. patent application Ser. No. 15/041,018, entitled "Visual Privacy Systems for Enterprise Mobility Management," filed Feb. 10, 2016. This application claims priority to U.S. patent application Ser. No. 15/041,018 and incorporates it by reference in its entirety.

BACKGROUND

Employees increasingly prefer to use personal user devices, such as laptops and cell phones, to perform work-related tasks. Allowing them to use personal devices for work functions can decrease the need for dedicated work mobile devices. From the perspective of an enterprise, allowing the workforce to use personal devices can lead to increased productivity. It can also lower technology costs for the enterprise, since fewer company-supplied computing devices are required.

Enterprise mobility management systems have been developed to accommodate personal devices in the workplace. To maintain the security of enterprise data, an enterprise can enroll the personal devices in the mobility management system. The mobility management system can manage access to work-related files and applications and generally implement security strategies. These strategies can include keeping enterprise data separate from personal data, allowing enterprise data to be remotely deleted from the device, and enforcing encryption policies for locally stored enterprise data.

However, some users hesitate to enroll in the mobility management system based on perceived privacy issues. Users might fear that the enterprise will be able to access personal details about the user or their device usage, even when this is not the case. Although users often have access to a legal notice regarding information collection by the management system, such notices generally do not set the user at ease. End user license agreements ("EULAs") explain legal rights but do not always clarify what data is being collected. The user also might not be able to easily retrieve the EULA after agreeing to it.

As a result, many users decide against enrolling their personal devices in the management system based on the perceived privacy implications.

For at least these reasons, a need exists for systems for visual privacy within enterprise mobility management.

SUMMARY

It is to be understood that both the foregoing general description and the following detailed description are exemplary and explanatory only and are not restrictive of the examples, as claimed.

Examples described herein include systems for visual privacy in an enterprise mobility management environment. The system can include a management server that performs stages related to enrolling user devices, storing privacy settings, and dynamically building privacy profiles for display at a user device. The management server can utilize a processor to perform stages for carrying out the visual privacy functionality.

In one example, the management server receives a registration request from a personal user device. A personal user device can be a phone, laptop, tablet, or other computing device that belongs to the user rather than the enterprise. As part of registration, the user can provide device ownership information indicating that the user device is personally owned.

Based on the registration request, the management server can store a device profile that includes information about the personal user device and the user. A device profile is any user profile that describes aspects of the user and the user device. It can be implemented across several tables in a database. The device profile generally can be used by the management server to determine what functions the user device can perform within the enterprise environment. For example, the device profile can determine which repositories the user device can access, which functions are available within particular managed applications, and other activities.

The management server can also associate at least one aspect of the device profile with a privacy setting regarding data collection. In this way, the device profile can also be linked to privacy settings. The privacy settings can be different for different user devices, based on different device profile attributes for those devices.

As part of the enrollment process or afterwards, the management server can transmit a privacy component to the personal user device for installation. The privacy component can allow the user to view what information is being collected by a management server. The privacy component can also alert the user to privacy changes. The privacy component can be a managed application or a link to a web clip, and can include an icon that persists on the user device.

The management server can dynamically build a first privacy profile based on the device profile and associated privacy setting. This can be done when the privacy component contacts the management server to request a privacy profile. It can also be done in response to a change in privacy settings at the management server.

The management server can then send the privacy profile to the user device for display. The privacy profile can summarize the data collection policies of the management server specific to the user device. This can include a summary section of what types of data are being collected, what types of data are not being collected, and what management functions the management server can perform at the particular user device. In one example, the user can select one of the types of data that is being collected on their device. Upon doing so, the user can be presented with a view of data that has been collected or a further explanation of the collection or usages of that particular type of data. Users can see a list of the exact data and information being collected from their device. The list can automatically update over time. For example, if a user installs a new application, the privacy policy can dynamically update to provide detailed instructions regarding what information is collected about the new application. This allows users to dynamically see exactly what the privacy implications are for their device, rather than a sttic list of the types of information that an IT department generally could collect, even if it does not.

This can allow the user to more fully appreciate the privacy implications of the management system. This transparency can result in a more trusting and understanding user base, and in turn, higher enrollment of personal user devices in the management system.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems for visual privacy in an enterprise mobility management environment. A privacy component can be installed on a user device that allows the user to view what information is being collected by a management server and alerts the user to privacy changes. The privacy component can be, for example, a managed application or a link to a web clip, and can include an icon that persists on the user device.

When a privacy setting changes on the management server, a message can be sent to the privacy component of the user device. The privacy component can provide a visual indication of the privacy change. Upon selection, the privacy component can cause a dynamic privacy profile to be displayed on the user device. The dynamic privacy profile can be a privacy policy overview that shows what the management server is collecting for multiple information types. The dynamic privacy policy can also visually indicate what has changed since the user last viewed the privacy overview. Further, the user can follow links for one or more information types that cause the privacy component to display the actual information that has been collected by the management server corresponding to the respective information type.

This can allow a user to quickly understand the privacy implications of being enrolled in an enterprise mobility management system. With clear insight into what is being collected, users are more likely to enroll and use a personal user device in the mobility management system.

Figure 1:
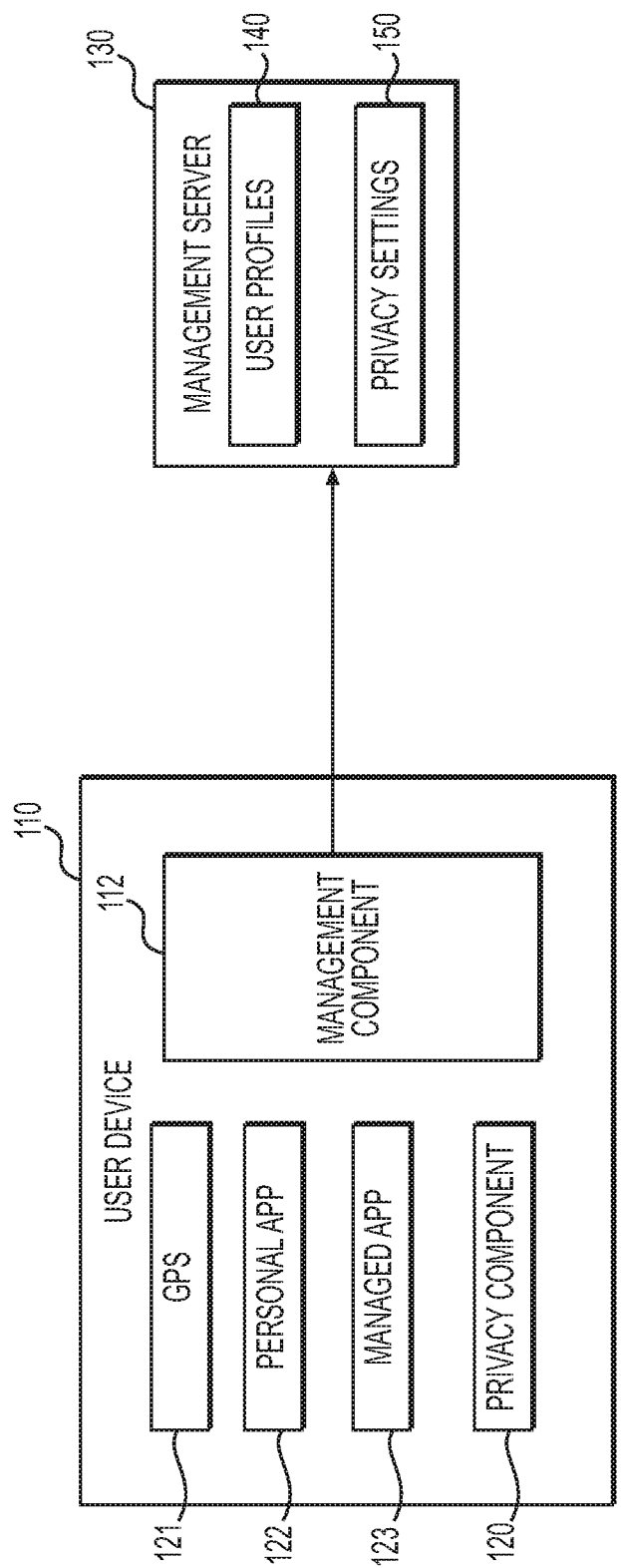
FIG. 1 is an exemplary illustration of system components.

FIG. 1 illustrates an exemplary system for visual privacy notification. A user device 110 can be any computing device, such as a cell phone, laptop, tablet, personal computer, or workstation. The user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. In this example, the user device 110 can be a personal user device that is owned by the user rather than an enterprise. The user device 110 can also be a corporate or enterprise-owned device.

A management server 130 can manage the personal user device 110 and other user devices in a workplace or other enterprise environment. To do so, the user device 110 can complete an enrollment process with the management server 130.

After a user device 110 has enrolled, the management server 130 can initiate installation of one or more managed applications 123 on the user device 110. The managed applications 123 can access enterprise information based on permissions stored at the management server 130. In this way, the user can use their personal user device 110 in a work environment. To maintain security of enterprise information, the management server 130 can control aspects of at least one managed application 123 used to carry out enterprise activities.

Each enrolled user device (including user device 110) can be associated with a user profile 140 (also called a "device profile"). A user profile 140 can determine the rights of each user device within the enterprise environment. For example, the management server 130 can use the user profile 140 associated with the user device 110 to determine which file repositories the user device 110 can access. The profile 140 can also control which managed applications 123 the user device 110 can use and, in one example, what functionality is available within those applications 123.

The management server 130 can create a user profile 140 based on user characteristics, geographical characteristics, and user device 110 characteristics. Some or all of this information can be collected during enrollment. For example, the user profile 140 can specify a user group to which the user device belongs. Example user groups can include software developers and executives. In one example, an administrator user can associate a user with a user group, and subsequent enrollment of the user device 110 can assign permissions and managed applications 123 to the user device 110 according to the user group. In another example, different profiles can be assigned to employees based on geographic characteristics of where the user is located. For example, different user profiles 140 can apply to different office locations. User profiles 140 can also specify that certain functionality is only available when a user is within a geofence, such as within confines of an office. In still another example, the user profile 140 can include device characteristics such as whether the device is owned by the user or the company, the types of hardware in the user device 110, or the particular software installed on the user device 110. These user profiles 140 are stored at the management server 130 in an example.

The management server 130 can associate the user device 110 with privacy settings 150. Privacy settings 150 can dictate what data, if any, the management server 130 will collect from the enrolled user device 110. In one example, an administrative user can set the management server 130 to collect or not collect information based on a user profile 140 attribute. For example, a privacy setting 150 to collect GPS data can be enabled or disabled for the user device 110.

In one example, an administrator can apply sweeping privacy changes by applying a privacy setting 150 to an attribute of the user profiles 140. As an example, the administrator can set privacy settings 150 regarding the collection of specific data types, such as GPS data, based on a user profile 140 attribute, such as ownership type. Whereas corporate-owned devices can be set to track GPS data, user-owned devices (such as user device 110) can be set to not track GPS data. The relationships between privacy settings 150 and user profile 140 attributes will be further discussed below in relation to FIG. 4.

Continuing with FIG. 1, a management component 112 can execute on the user device 110. The management component 112 can allow the management server 130 to interact with the managed application(s) 123 in an example. The management component 112 can be installed during enrollment with the management server 130.

The management component 112 can include a device-level component, such as an application programming interface (an "API"), agent application, hypervisor, or virtualized device, and an application-level component, such as an API, SDK, application wrapper, or workspace agent application.

The device-level management component can include system-level privileges. The application-level management component can include privileges in managed applications 123, which can be developed for operation with the management server 130. Reference to the management component 112 is understood to include either or both of the device-level and application-level components unless otherwise specified.

The management server 130 can interact with the management component 112 with calls to an application (i.e., application level) or the operating system (i.e., device level) of a user device 110. In one example, based on a permissions control, the management server 130 can turn functionality on and off within the managed application(s) 123 through calling subroutines in the management component 112. If a permission control specifies it, the management server 130 can turn off functionality at the user device 110, such as printing, emailing, or Internet access. This can allow for added security when viewing or editing particularly sensitive documents.

The management component 112 can also be responsible for collecting data as specified in the privacy settings 150. Privacy settings 150 can be specified for a particular user or a group of users. The managed application(s) 123 can be set to collect particular types of usage data in one example, reporting the data to the management server 130 through the management component 112. In another example, the management component 112 can request information from the operating system of the user device 110. The operating system can interact with other components, such as GPS component 121 (also called "GPS"), to collect data requested by the management component 112. The operating system can also collect information related to one or more personal applications 122 that execute on the user device 110. Because the operating system supplies resources used by various drivers and applications running on the user device 110, the operating system can also collect information regarding usage of those resources.

In one example, the managed application(s) 123 can communicate on an enterprise network with the management server 130 to securely access files and other information. The user device 110 can communicate with the management server 130 over the network using one or more modulators, demodulators, multiplexers, demultiplexers, network communication devices, wireless devices, antennas, modems, and any other type of device configured to enable data communication through a communication network.

In one example, a privacy component 120 can execute on the user device 110. The privacy component 120 can be installed as part of enrollment with the management server 130. The privacy component 120 can be a managed application 123 that is installed on the user device 110 from the management server 130, such as through communications with the management component 112. Alternatively, the privacy component 120 can be part of the management component 112 or include the management component 112.

The privacy component 120 can include an option to display a current privacy profile. The display option can be provided in the form of an icon or other executable file that persists on the user device 110. The display option can allow the user to check the privacy settings 150 specific to the user device 110 at any time. For example, if the user selects the icon, the privacy component 120 can contact the management server 130 and request a current privacy profile. The privacy profile can then be displayed in a graphical user interface ("GUI") on the user device 110.

In one example, the privacy component 120 can provide a visual indicator that a change in privacy settings 150 has occurred. The visual indicator can include a notification bar, an icon, a change to an existing icon, a badge, or other visual indicator. In another example, the visual indicator of the privacy component 120 can indicate that the change in privacy settings 150 applies to a specific personal application 122 or managed application 123. In this case, the visual indicator can be a badge positioned next to an icon of the personal application 122 or managed application 123. The visual indicator can be a link to a web clip in one example. In another example, the visual indicator can be a link to the privacy component 120, which can include a GUI for displaying the privacy profile.

The privacy settings 150 can change based on settings selected by an administrator at the management server 130. The administrator can change privacy settings 150 relative to a user profile 140 attribute associated with the user device 110. Alternatively, the administrator can change a setting specific to the user device 110. Additionally, installing a new managed application 123 at the user device 110 can cause a change in privacy settings 150. For example, the new managed application 123 might require use of GPS 121 in order for the managed application 123 to be installed. In that example, if GPS 121 tracking was previously turned off, the user can agree to turn it on as a result of installing the new managed application 123. Although GPS 121 is used as an example, it is just one of many possible features for which data can be tracked based on the privacy settings 150.

In one example, when a change in privacy settings 150 occurs relative to the user device 110, the management server 130 can notify the privacy component 120 of the user device 110. The management server 130 can determine all user devices affected by a privacy change and contact those user devices. For example, when a privacy setting 150 of a user profile 140 attribute changes, the management server 130 can determine a list of all user devices (including the user device 110) that share that attribute. Then the management server 130 can send a message to the management component 112 of those user devices. The management component 112 on the user device 110 can then notify the privacy component 120 of the change to the privacy settings 150.

In another example, the privacy component 120 can periodically check with the management server 130 for updates to the privacy settings 150 for the user device 110. The user can set a periodic time interval for checking for updated privacy settings 150 in one example.

After the privacy component 120 has provided a visual indicator that privacy settings 150 have changed, the user can select the visual indicator or the icon of the privacy component 120 to view a current privacy profile. In one example, the privacy profile is displayed in a web clip that populates with privacy information from the management server 130. The web clip can provide a GUI on the screen of the user device 110 for reviewing a current privacy profile. Alternatively, the privacy profile and GUI can be generated by an application that is part of the privacy component 120 on the user device 110.

The GUI can be populated with privacy information from the management server 130. In one example, the privacy component 120 can compare a new privacy profile against an existing privacy profile and visually indicate differences in the GUI. For example, if a new privacy profile indicates that a type of data is being collected but was not previously indicated in a locally-stored privacy profile, the GUI can highlight the new type of data. The highlight can include a sound indicator, a different-colored text, a different font or font size, or any other highlighting mechanism.

When displayed in the GUI, the privacy profile can provide overviews of what types of information are being collected, what types are not being collected, and what types of management functions the management server 130 can perform on the user device 110. For one or more information types within an overview, the privacy component 120 can provide links to more detailed information regarding the actual collection of that information type. This can include displaying raw data to the user that the management server 130 has collected for that information type. The privacy profile can additionally provide a link to a relevant EULA or other document that governs data privacy permissions of the management server 130.

In addition, the management server 130 can utilize the management component 112 to uninstall the privacy component 120 and managed application(s) 123. This can be done, for example, if the user device 110 is lost or if an employee leaves the job. The personal application(s) 122 can remain on the user device 110, unaffected.

Although an example has been described where the privacy component 120 and other applications 123 are managed, the applications can also be unmanaged applications. In addition, the management component 112 and management server 130 need not be provided in all examples. For example, the applications executing on the device can be developed using a software development kit or API, or wrapped to provide the described functionality.

Figure 2:
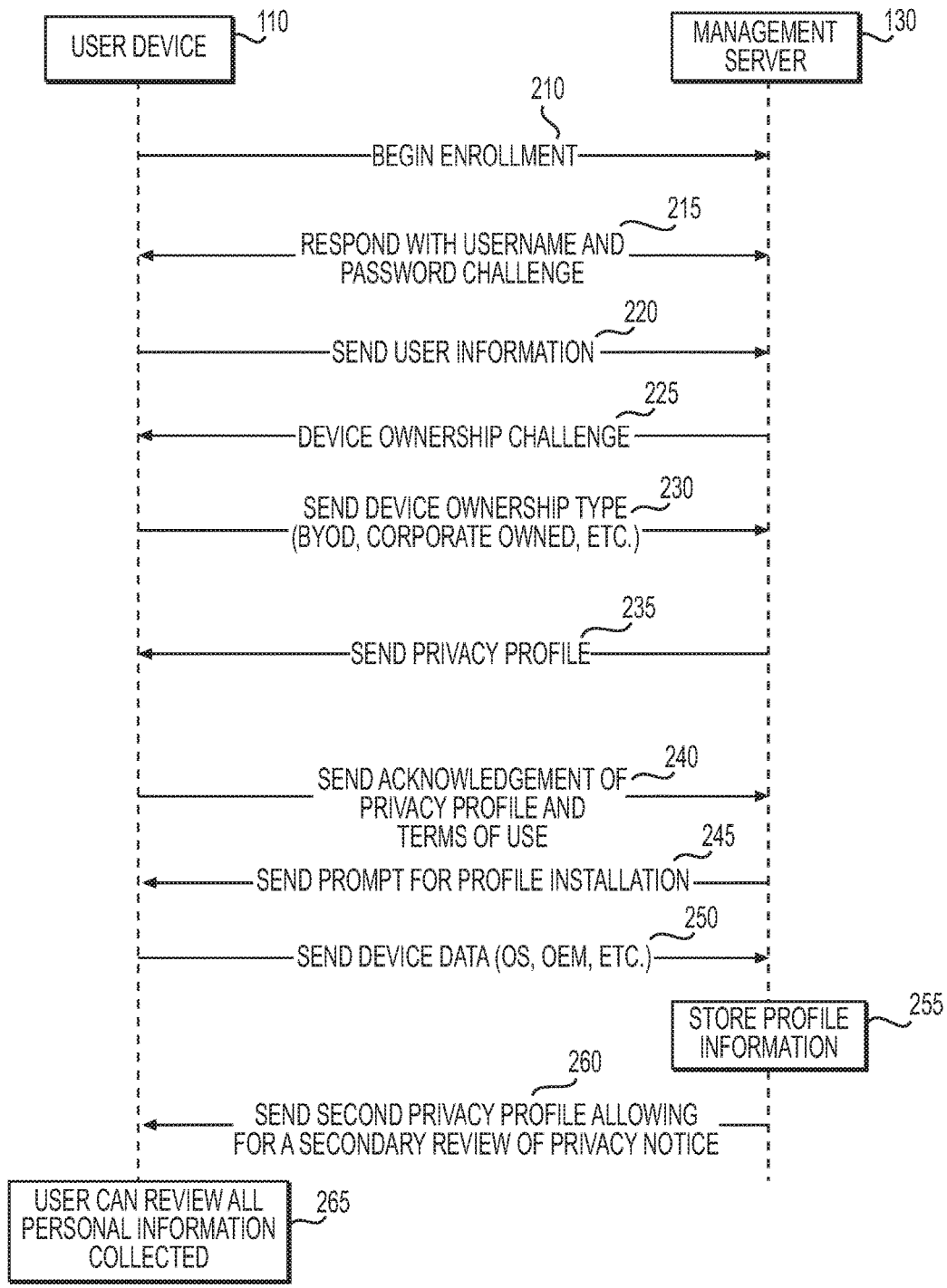
FIG. 2 is an exemplary method executed in a system.

FIG. 2 illustrates an exemplary method that can be executed within a system. Stages 210 through 255 can be part of an enrollment process. Stages 260 and 265 can involve sending and displaying an updated privacy profile to the user device 110.

At stage 210, the user device 110 can send a message to the management server 130 to begin enrollment. In one example, the message can be sent in response to the management server 130 sending an enrollment invitation to the user device 110. The message from the user device 110 can include a tenant identifier or registration token that allows the management server 130 to confirm the identity of the user device 110. In one example, the tenant identifier or registration token is sent from the management server 130 to the user device 110 as part of the enrollment invitation.

The tenant identifier can indicate an organization or group within one or more enterprises that use the management server 130. In a software as a service ("SAS") example, multiple companies or organizations can be serviced by a single management server 130. Those companies or organizations can each be a different tenant. In another example, multiple tenants can exist within a single company. The registration token can be generated at the management server 130 and allow the management server 130 to identify the specific user device 110 that is attempting to enroll.

At stage 215, the management server 130 can identify the user device 110 based on the enrollment message. The management server 130 can then respond by sending a user identity challenge to the user device 110. The identity challenge can include prompting the user for user information, such as a user name and password. At stage 220, the user device 110 can send the requested user information to the management server 130.

If the user information matches information already stored at the management server 130, then at stage 225 the management server 130 can issue a device ownership challenge. The device ownership challenge can prompt the user to select the ownership status of the user device 110 being enrolled at the management server 130. For example, the ownership status can indicate whether the device is a personal device or is corporate owned.

At stage 230, the user device 110 sends device ownership information to the management server 130. In addition to the ownership status, the ownership information can include device details, such as operating system type and version. In other examples, the device ownership status can be known by the management server 130. For example, an IT administrator can maintain a list of corporate devices.

At stage 235, the management server 130 can send a first privacy profile to the user device 110 to ensure that the user understands the initial privacy implications of enrollment. The first privacy profile can be dynamically generated based on the ownership information, device information, tenant, and identified user. These characteristics can all be part of a user profile 140 that is associated with the user device 110.

The privacy profile can include a collection of information that is used to populate a user interface ("UI"). In one example, this information is sent to the privacy component 120, which in turn displays a populated UI at the user device 110. In another example, the management server 130 delivers the privacy profile to the user device 110 by directing the user to a web clip on the network. The web clip can display a populated UI in a browser application of the user device 110. The privacy profile can list types of data that the enterprise will gather and will not gather. The privacy profile can further list functions that the management server 130 will be able to perform at the user device 110 (for example, through use of the management component 112).

In one example, as part of stage 235, an EULA is sent for display in addition to the privacy profile. The EULA can provide terms of use and other agreements between an enterprise and the user. This can include describing permitted use of user and device information and management of the managed applications 123. The privacy profile or EULA can also describe applications that will be installed on the user device 110 as part of enrollment. In one example, the privacy profile can include a link to view the EULA.

At stage 240, the user device 110 can send a message to the management server 130, acknowledging that the user agrees to the EULA and with the privacy settings 150 indicated by the privacy profile. In response, at stage 245, the management server can send a prompt for profile installation. At stage 250, the user device 110 can send device information regarding the operating system and other applications that exist on the device. In one example, stage 250 is performed as part of stage 230. Stage 250 can repeat periodically, and the management component 112 or privacy component 120 can monitor the device for any changes, such as installation or removal of applications. At stage 255, the management server 130 can store the profile information. As previously discussed, the profile information can be a user profile 140, and can include device information (such as operating system version), ownership information (such as personal or corporate device), identification of a tenant, and user information (such as identification of a user group).

Profile installation can include installing the management component 112, managed applications 123, and the privacy component 120. In addition, the management server 130 can turn on or off settings in the operating system of the user device 110, as permitted by the user. These specific installations and functionality changes can be based on the user profile 140 associated with the user device 110.

At stage 260, the management server 130 can send a second privacy profile to the user device 110. This can occur, for example, when a privacy setting 150 changes for the user profile 140 associated with the user device 110. In another example, the user device 110 requests an updated privacy profile, and the second privacy profile is sent in response.

The second privacy profile can visually highlight differences between the second privacy profile and the first privacy profile. For example, the privacy component 120 can retrieve the first privacy profile from local storage at the user device 110 and compare the information from the first and second privacy profiles. Alternatively, the management server 130 can flag new or changed information in the second privacy profile based on comparing modification dates of the privacy settings 150 to a date that the prior privacy profile was provided. In displaying the second privacy profile, the new or updated information can be visually highlighted.

The second privacy profile can include links to additional information regarding what data is being collected. In one example, the UI displays a button or link that allows the user to retrieve actual or representative data that is collected by the management server 130. Additionally, the second privacy profile can include a link to access an associated EULA.

Figure 3:
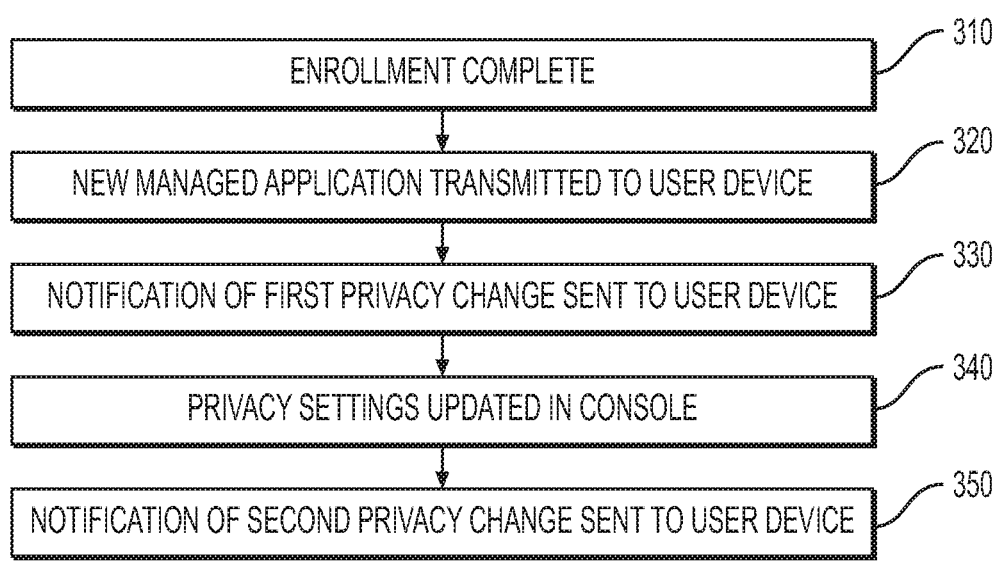
FIG. 3 is another exemplary method executed in a system.

FIG. 3 includes exemplary stages that can be performed in an example system after enrollment is complete at stage 310. At stage 320, a new managed application 123 can be transmitted to the user device 110 from the management server 130. This can occur, for example, when the user elects to download the managed application 123 or when a managed application 123 is pushed to a user by the management server 130. The option to download or automatic pushing of the managed application 123 can be provided based on the managed application 123 being approved for use based on the user profile 140 associated with the user device 110.

At stage 330, the management server 130 can send a notification to the privacy component 120, signifying a privacy change. The privacy change can be related to the managed application 123 installed as part of stage 320. For example, the managed application 123 can require that GPS data collection is turned on in order to function correctly.

The notification can cause the user device 110 to display badging in one example. The badging can be displayed alongside an icon for the privacy component 120. Alternatively, the badging can be displayed alongside an icon for the managed application 123. This can allow the user to quickly determine that privacy settings 150 have changed based on installation of the managed application 123.

In one example, the user can select the badging or the privacy component 120 icon to view an updated privacy profile. This can include retrieving the privacy profile from the management server 130. In one example, the privacy profile is sent along with the notification as part of stage 330. This privacy profile can be stored locally on the user device 110 for later viewing by the user. The user device 110 can keep a history of privacy profiles in one example. The history can allow the privacy component 120 to highlight changes to the privacy profile. In another example, the history is stored at the management server 130. An updated privacy profile can be sent from the management server 130 when requested by the user device 110. The provided privacy profile can also include indicators regarding which portions of the privacy profile have changed.

At stage 340, an administrative user can update privacy settings in a console. The console can provide the administrative user with editing capabilities for one or more features of a user profile 140 or privacy settings 150. For example, if a user is promoted into a new position, the administrative user can change privacy settings 150 to be commiserate with the new position. This can also include changing a user group associated with the user, which can impact the user profile 140 associated with the user device 110.

Based on the update at stage 340, another privacy profile can be sent from the management server 130 to the user device at stage 350. Stage 350 can include sending a notification of a second privacy change in one example. Alternatively, the additional privacy profile can be sent after the user device 110 has contacted the management server 130 to check for or request an updated privacy profile. Sending the privacy profile can include sending data that indicates which portions have changed. The privacy component 120 can also cause the user device 110 to display a badge or other visual indicator of the change.

As described for stage 330, the privacy profile can be retrieved and viewed as part of the notification process. The privacy profile can be sent by the management server 130 along with the notification of stage 340. Alternatively, the user device 110 can contact the management server 130 to request the updated profile once the user selects the visual indicator or privacy component 120 icon.

Figure 4:
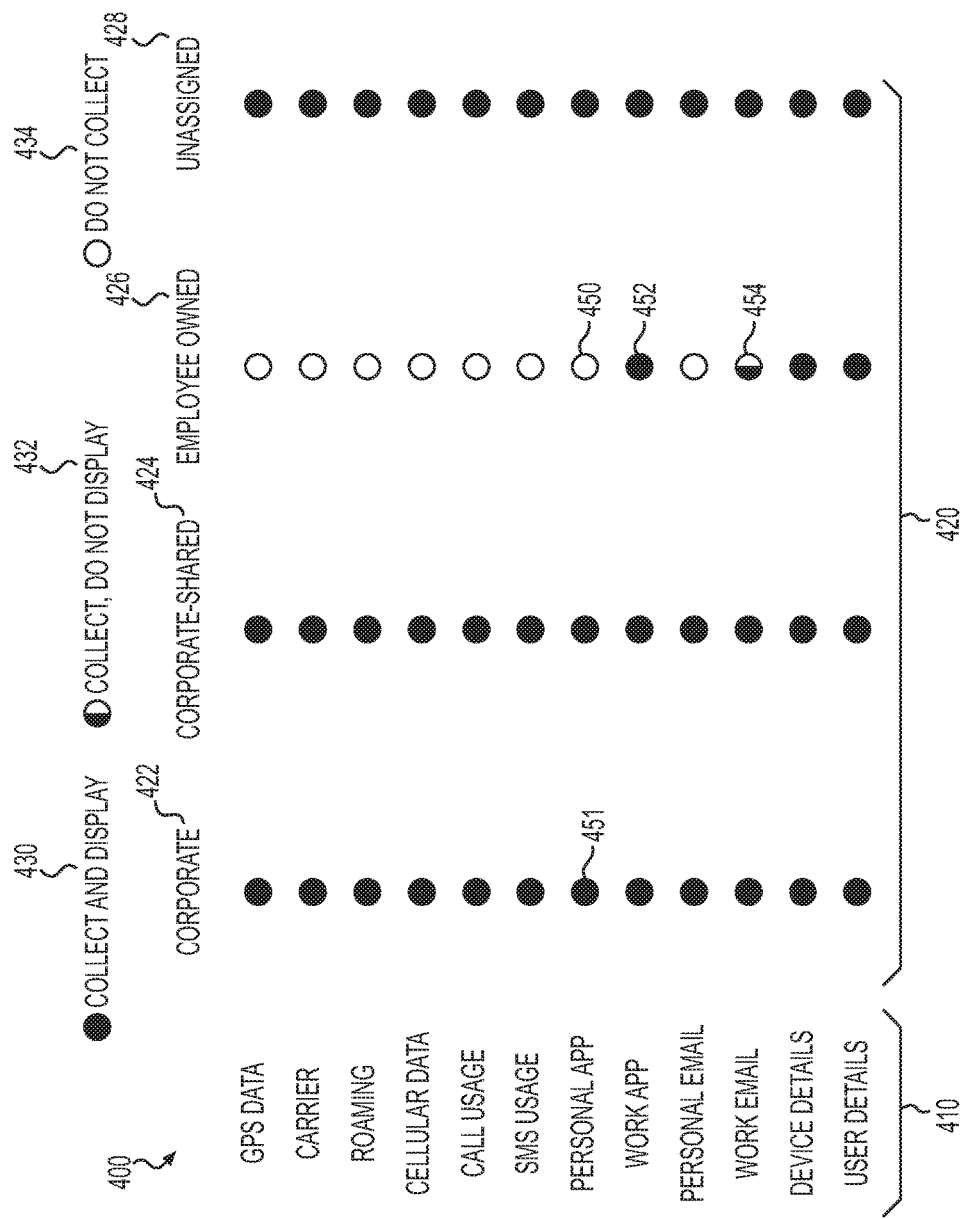
FIG. 4 is an exemplary illustration of a console user interface for privacy settings.

FIG. 4 includes an example illustration of a console GUI 400. An administrator can use the console GUI 400 to change privacy settings for various features 410 of user devices. The settings can be based on one or more user profile 140 attributes, such as device ownership. Although this particular example applies to device ownership, a similar GUI 400 can allow the administrator to make changes based on other user profile 140 attributes. An administrator can quickly apply privacy changes across many user devices within an enterprise by changing privacy settings 150 for user profile 140 attributes.

In the example of FIG. 4, device ownership is broken down into four ownership types: corporate 422, corporate-shared 424, employee-owned 426, and unassigned 428. Each feature 410 can have a privacy setting 420 that is specific to a particular ownership type 422, 424, 426, 428. This can allow for different privacy settings 420 based on ownership type 422, 424, 426, 428.

In this example, the privacy settings 420 can include one of three setting types 430, 432, 434. These setting types 430, 432, 434 are visually represented by circles that are either filled, half-filled, or empty. For a first setting type 430, a filled circle represents information to collect and display as part of a privacy profile. For a second setting type 432, a half-filled circle represents information to collect but not display as part of a privacy profile. This setting can be used to collect data for a feature 410 but to prevent the privacy profile for relaying redundant information to the user. For example, a first setting 452 can specify collecting data from work applications and displaying that fact in a privacy profile. But a second setting 454 can specify collecting data from work email but not expressly stating that in the privacy profile. This can make sense when the work email is opened through a work application, and specifically pointing out both in the privacy profile could be redundant. For a third setting type 434, an empty circle can represent information that should not be collected. These setting types 430, 432, 434 are exemplary only, and other setting types are possible.

In this example, data collection and display is turned on for all features 420 of corporate-owed 422 devices. This can cause the management component 112 of a corporate-owned device to collect such information as GPS, data, carrier data, and roaming information. The corporate-owned device can also collect information in personal applications, work applications, personal email, and work email.

However, an employee-owned 426 device, such as the user device 110 of FIG. 1, can be set to only collect and report some (or none) of this information. In the example GUI 400 of FIG. 4, the employee-owned 426 device has been set to not collect data from any features 410 other than work applications, work email, device details, and user details. Although a third setting 450 causes the system to not collect data from the personal applications 122 on employee-owned 426 user devices, a fourth setting 451 can cause that information to be collected from corporate-owned 422 devices. However, employee-owned 426 user devices can be set by a first setting 452 to collect and display data from one or more work applications.

The features 410 listed for potential privacy control in this example are not meant to be limiting. In one example, individual managed applications 123 can be represented in the features 410 list. Different managed applications 123 can potentially collect different types of information. Those different types of information can also be individually represented in the features 410 list.

Additionally, as previously stated, the GUI 400 is not limited to specifying privacy settings 150 based on device ownership. In one example, an administrator can select a user profile 140 attribute, such as location, from multiple user profile 140 attributes to which to apply privacy settings 420. As an example, different enterprise locations could be listed or selectable by the administrator. The administrator could then apply privacy settings 420 differently for the different locations. Additional user profile 140 attributes for selection can include different operating systems, device types, or user groups.

In still another example, the administrator can select a particular user device 110 from a list of user devices that are enrolled at the management server 130. The GUI 400 can populate with features 410 and privacy settings 420 specific to that user device 110. This can allow the administrator to edit privacy settings 420 specifically for the user device 110 without impacting the privacy settings 150 of other user devices that might share a common user profile 140 attribute, such as device ownership type or location.

Figure 5:
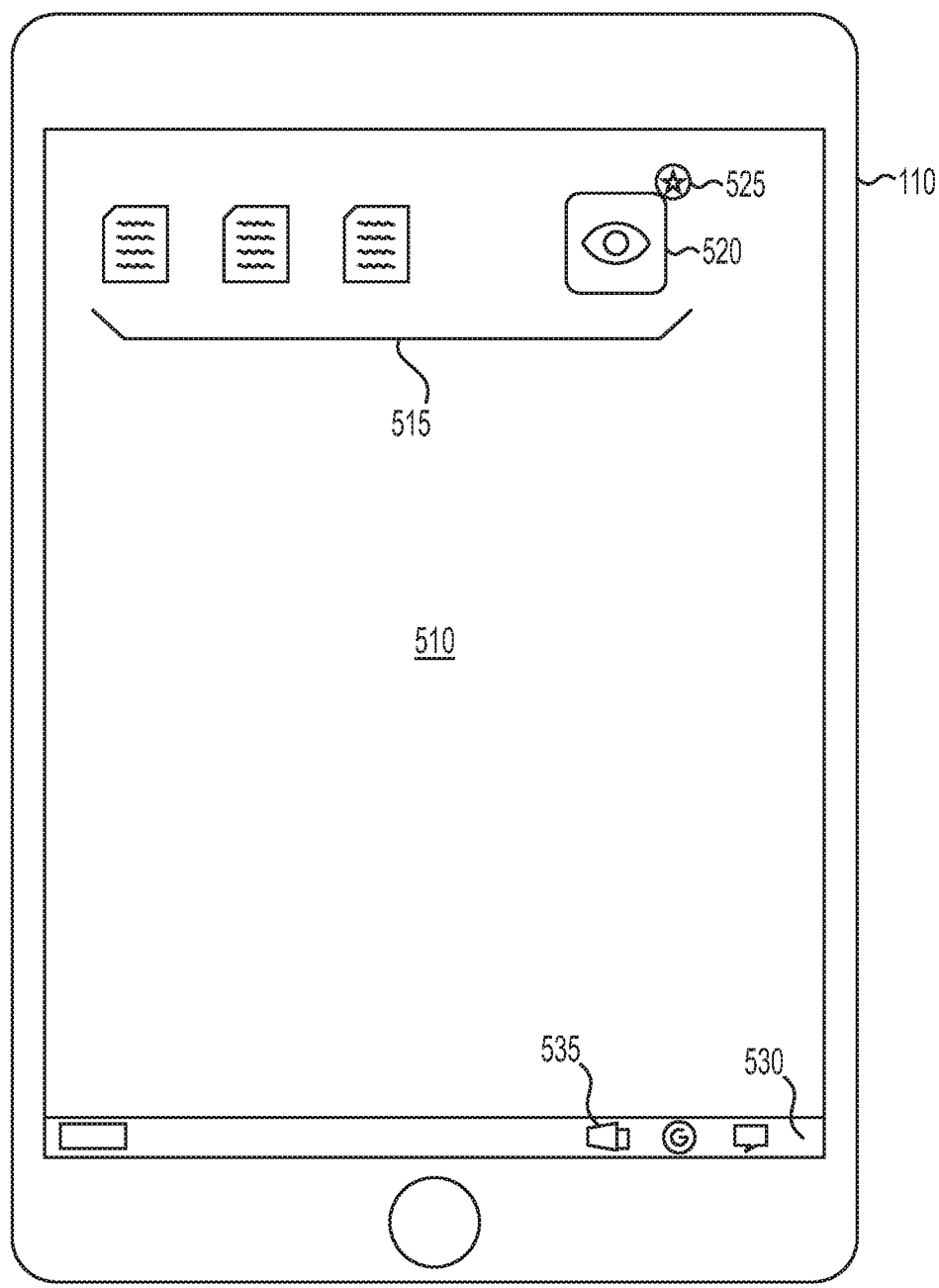
FIG. 5 is an exemplary illustration of a user interface on a user device.

FIG. 5 includes an example illustration of a user device 110 that executes the privacy component 120. The user device 110 can include a screen 510 that displays icons 515 for various files or applications. In one example, the privacy component 120 can include an icon 520 that is displayed on the user device 110. As pictured, the icon 520 can exist on a home screen or card. It can alternatively exist in another location, such as a task tray 530.

When the privacy settings 150 for the user device 110 are changed, the privacy component 120 can be notified. This can cause the privacy component 120 to provide a visual indicator of the change. In one example, the icon 520 itself serves as the visual indicator, and appears only when the privacy component 120 receives a message from the management server 130 that the privacy settings 150 have changed for the user device 110. In another example, the visual indicator of a change to the privacy settings 150 can include a badge 525. The badge 525 can be displayed next to the icon 520 for the privacy component 120 in an example. This can allow the user to select the icon 520 and review a privacy profile. In still another example, when a privacy setting 150 changes with respect to a particular application, the badge 525 can be displayed next to an icon associated with that application. Alternatively, an icon 535 for the application with the changed privacy setting 150 can be placed in the task tray.

When the user selects the icon 520 of the privacy component 120 (or a visual indicator, such as badge 525 or icon 535), the privacy component 120 can display the current privacy profile. In one example, the privacy profile can be displayed as a web clip that is populated with privacy information from the management server 130. In another example, the privacy component 120 launches a GUI that is part of the privacy component 120. The GUI can display the privacy information that is received from the management server 130, either prior to or after the user selection of the icon 520 or other visual indicator.

Figure 6:
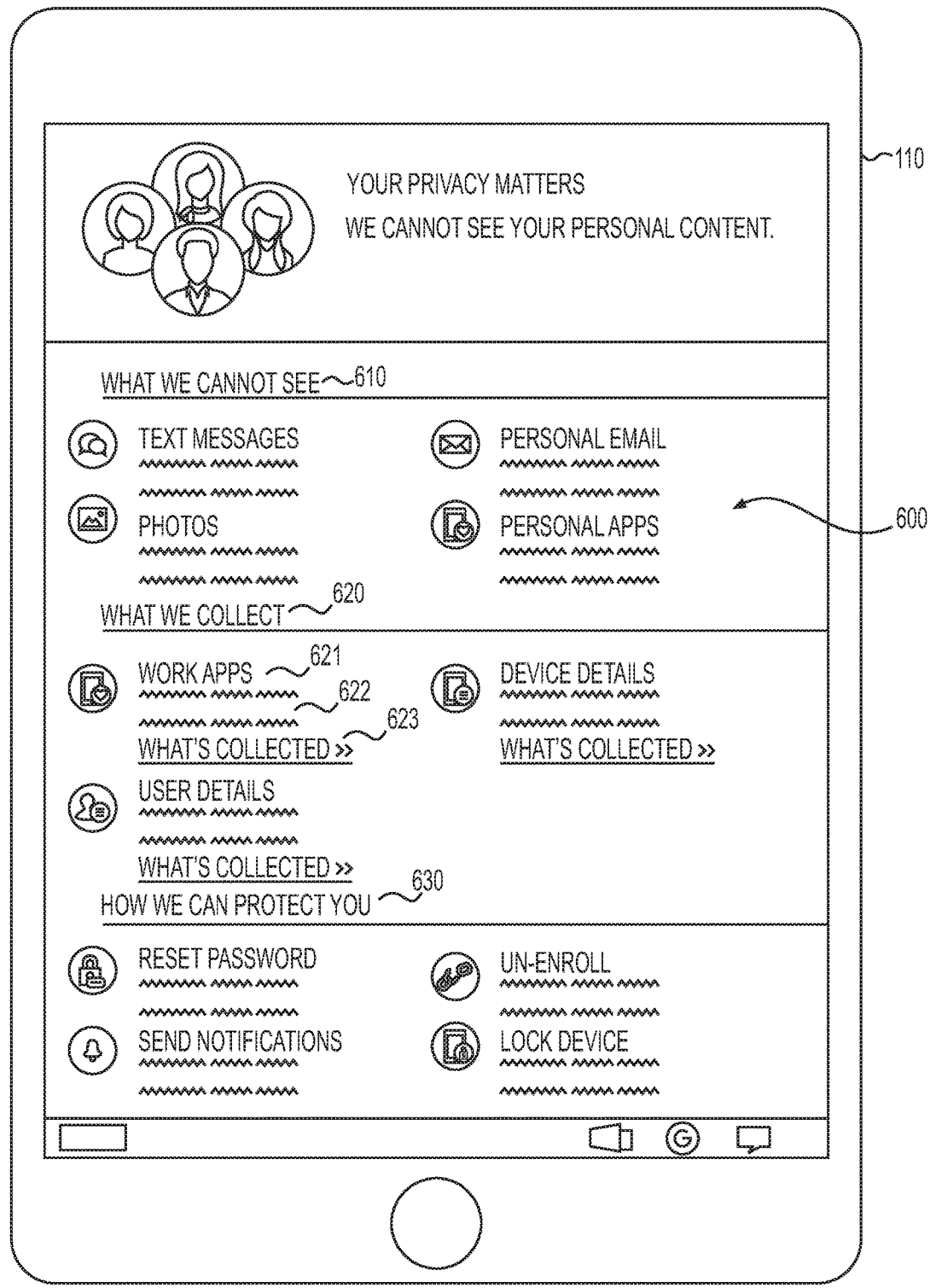
FIG. 6 is an exemplary illustration of a visual privacy notification displayed on a user device.

FIG. 6 includes an example illustration of a privacy profile 600 displayed on the user device 110. The privacy profile 600 can be constructed dynamically based on the privacy settings 150 that apply to the user device 110. The privacy profile 600 can include a first section 610 that describes types of data will not be collected by the management server 130. This can include features 410 with privacy settings 150 that specify that data should not be collected (such as the third setting type 434 from FIG. 4). In this particular example, the employee-owned 426 user device 110 is not currently subject to data collection for text messages, photos, personal email, or personal applications. This can align with corresponding settings of features 410 in the console GUI 400, such as SMS usage, personal app, and personal email. A more detailed description of the non-collected features 410 can also be provided.

A second section 620 in the privacy profile 600 can describe types of data that are being collected by the management server 130. In this example, this includes data from features 410 such as work apps, device details, and user details, all of which are assigned the first setting type 430 in FIG. 4. The description of this data can be further broken down for the user. For example, a feature title 621 can identify work apps, and text 622 below that title 621 can describe what aspects of the work apps are being tracked or what specific types of data are being collected. Further, the privacy profile 600 can include a link 623, such as a button or a uniform resource locator, that allows the user to retrieve actual data collected at the management server 130. In one example, clicking the link 623 can send a message to the management server 130 to retrieve historical data that has been collected based on the work app privacy setting 150. Some of the historical data or a summary of historical data can be displayed on the user device 110. In another example, clicking the link 623 can provide additional context, such as a more detailed explanation, of the data being collected.

A third section 630 can include a list of functions that can be performed at the user device 110 by the management server 130. This can make the user aware of the capabilities granted by the management component 112 and currently allowed by the user. These can include changing user login credentials or sending notifications to the user device 110. In one example, the permitted functions can include locking the user device 110. The locking function can be used to lock the user device 110 into a managed application 123, such that the user cannot use other applications while the managed application 123 is in use. A further permitted function can be to un-enroll the user device 110. This can allow the management server 130 to wipe the user device 110 of all managed applications 123, locally-stored enterprise files and data, and some or all of the management component 112. Un-enrollment can be useful when an employee leaves an organization, or when a user loses their device 110.

Figure 7:
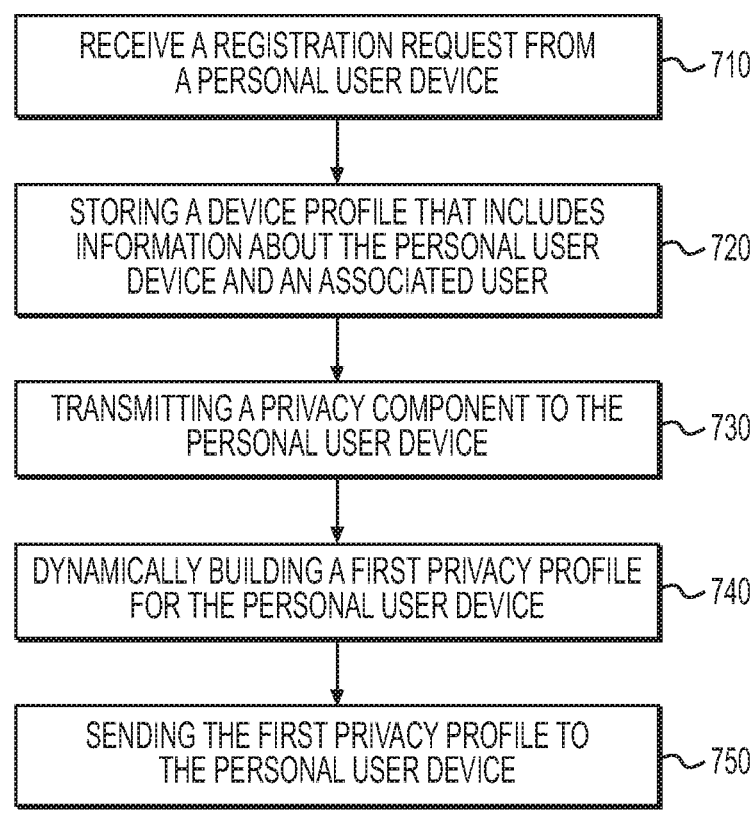
FIG. 7 is an exemplary method executed in a system.

FIG. 7 includes exemplary stages that can be performed in a system. At stage 710, a management server 130 can receive a registration request from a personal user device 110. The registration request can initiate enrollment. In one example, the registration request initiates enrollment in response to an invitation to enroll that is sent to the user device 110 from the management server 130.

The registration request can provide, among other things, user device ownership information. The user device ownership information can be sent as part of a single registration request message in one example. Alternatively, the registration request can include multiple messages from the user device 110 that are part of a series of back-and-forth communications between the user device 110 and the management server 130.

At stage 720, the management server 130 can store a device profile 140 that includes information about the personal user device and user information pertaining to an associated owner of the personal user device 110. The device profile 140 is also referred to above as a user profile 140. The management server can associate at least one aspect of the device profile 140 with a privacy setting 150 regarding data collection. Potential aspects that can be associated with a privacy setting 150 include device ownership type, user group, location, and individual device features 410.

In one example, the device profile 140 is stored after enrollment is complete. In another example, the device profile 140 is stored before transmitting an initial privacy profile to the user device 110. If the user ultimately declines to complete enrollment, the device profile 140 can be deleted.

At stage 730, the management server 130 can transmit a privacy component 120 to the personal user device 110 for installation. The privacy component 120 can include an application portion that communicates with the management server 130 through the management component 112. In another example, the privacy component 120 can include a web link that links to a web clip. The web clip can be populated and controlled by the management server 130. In still another example, the privacy component 120 includes an icon 520 for displaying a privacy profile.

At stage 740, the management server 130 can dynamically build a first privacy profile 600 for the user device 110. This can include querying the current privacy settings 150 for the first user device 110. In one example, the management server 130 compares an assigned device profile 140 to privacy settings 150. The management server 130 can also compare current privacy information against historical privacy information to determine and highlight differences. In another example, the privacy component 120 compares the privacy information it receives from the management server 130 to the existing local privacy information to determine any differences.

At stage 750, the first privacy profile 600 is sent to the user device 110, where it is displayed. Sending the first privacy profile 600 can mean sending the privacy profile 600 data for inclusion in a GUI that is part of the privacy component 120. Alternatively, it can include sending the privacy profile 600 data to a webserver that generates a web clip for display on the user device 110.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for displaying information that a management server can collect from a mobile device, comprising:
   a non-transitory, computer-readable medium that contains instructions;
   a processor that executes the instructions to perform stages at the mobile device, the stages comprising:
      installing a privacy component relating to managing the mobile device using the management server;
      receiving an indication of a privacy change from the management server, wherein the indication is sent automatically to the privacy component from the management server based on the privacy change, wherein the privacy change includes a change in information collected by the management server from the user device as compared to information collected prior to the privacy change; and
      based on the indication of the privacy change, displaying a badge on an icon of the privacy component to indicate the privacy change.

2. The system of claim 1, the stages further comprising:
   receiving a first selection of the icon prior to displaying the badge, causing the mobile device to display first information being collected from the mobile device by the management server; and
   receiving a second selection of the icon after displaying the badge, causing the mobile device to display second information being collected from the mobile device by the management server after the privacy change.

3. The system of claim 2, wherein displaying the second information includes displaying a first section of data items that the management server does not collect and a second section of data items that the management server does collect.

4. The system of claim 3, wherein the second section of data items includes at least two of application details, mobile device details, and user details.

5. The system of claim 3, wherein the first section of data items includes at least two of text messages, personal emails, personal photos, and personal apps.

6. The system of claim 3, wherein displaying the second information includes displaying a third section of functions that can be performed at the mobile device by the management server.

7. The system of claim 2, wherein displaying the second information includes presenting an option to unenroll from the management server.

8. A non-transitory, computer-readable medium containing instructions executed by a processor to perform stages for displaying information that a management server can collect from a mobile device, the stages comprising:
   installing a privacy component relating to managing the mobile device using the management server;
   receiving an indication of a privacy change from the management server, wherein the indication is sent automatically to the privacy component from the management server based on the privacy change, wherein the privacy change includes a change in information collected by the management server from the user device as compared to information collected prior to the privacy change; and based on the indication of the privacy change, displaying a badge on an icon of the privacy component to indicate the privacy change.

9. The non-transitory, computer-readable medium of claim 8, the stages further comprising:
receiving a first selection of the icon prior to displaying the badge, causing the mobile device to display first information being collected from the mobile device by the management server; and
receiving a second selection of the icon after displaying the badge, causing the mobile device to display second information being collected from the mobile device by the management server after the privacy change.

10. The non-transitory, computer-readable medium of claim 9, wherein displaying the second information includes displaying a first section of data items that the management server does not collect and a second section of data items that the management server does collect.

11. The non-transitory, computer-readable medium of claim 10, wherein the second section of data items includes at least two of application details, mobile device details, and user details.

12. The non-transitory, computer-readable medium of claim 10, wherein the first section of data items includes at least two of text messages, personal emails, personal photos, and personal apps.

13. The non-transitory, computer-readable medium of claim 10, wherein displaying the second information includes displaying a third section of functions that can be performed at the mobile device by the management server.

14. The non-transitory, computer-readable medium of claim 9, wherein displaying the second information includes presenting an option to unenroll from the management server.

15. A method for displaying information that a management server can collect from a mobile device, comprising:
installing a privacy component relating to managing the mobile device using the management server;
receiving an indication of a privacy change from the management server, wherein the indication is sent automatically to the privacy component from the management server based on the privacy change, wherein the privacy change includes a change in information collected by the management server from the user device as compared to information collected prior to the privacy change; and
based on the indication of the privacy change, displaying a badge on an icon of the privacy component to indicate the privacy change.

16. The method of claim 15, further comprising:
receiving a first selection of the icon prior to displaying the badge, causing the mobile device to display first information being collected from the mobile device by the management server; and
receiving a second selection of the icon after displaying the badge, causing the mobile device to display second information being collected from the mobile device by the management server after the privacy change.

17. The method of claim 16, wherein displaying the second information includes displaying a first section of data items that the management server does not collect and a second section of data items that the management server does collect.

18. The method of claim 17, wherein the second section of data items includes at least two of application details, mobile device details, and user details.

19. The method of claim 17, wherein the first section of data items includes at least two of text messages, personal emails, personal photos, and personal apps.

20. The method of claim 17, wherein displaying the second information includes displaying a third section of functions that can be performed at the mobile device by the management server.

* * * * *